United States Patent [19]

Harbinski et al.

[11] Patent Number: 5,774,716
[45] Date of Patent: Jun. 30, 1998

[54] COMPUTER PROGRAM PRODUCT TO ENABLE MULTIPLE COMPUTER SYSTEMS TO SHARE SINGLE SEQUENTIAL LOG

[75] Inventors: Mark Walter Harbinski; Francis Joseph Ricchio, both of San Jose, Calif.

[73] Assignee: International Business Machines Corp., Armonk, N.Y.

[21] Appl. No.: 462,843

[22] Filed: Jun. 5, 1995

Related U.S. Application Data

[62] Division of Ser. No. 394,582, Feb. 27, 1995.

[51] Int. Cl.[6] .................................................. G06F 17/30
[52] U.S. Cl. ........................ 395/618; 395/617; 395/650
[58] Field of Search .................................. 395/600, 650, 395/617, 618

[56] References Cited

U.S. PATENT DOCUMENTS

| | | | |
|---|---|---|---|
| 4,507,751 | 3/1985 | Gawlick et al. | 364/900 |
| 4,646,229 | 2/1987 | Boyle | 364/200 |
| 5,151,988 | 9/1992 | Yamagishi | 395/600 |
| 5,276,878 | 1/1994 | Sutton et al. | 395/650 |
| 5,455,947 | 10/1995 | Suzuki et al. | 395/650 |
| 5,463,754 | 10/1995 | Beausoleil et al. | 395/200.08 |
| 5,485,608 | 1/1996 | Lomet et al. | 395/600 |
| 5,513,336 | 4/1996 | Vishlitzky et al. | 395/463 |
| 5,519,861 | 5/1996 | Ryu et al. | 395/600 |
| 5,530,848 | 6/1996 | Gilbert et al. | 395/600 |
| 5,530,855 | 6/1996 | Satoh et al. | 395/600 |
| 5,544,359 | 8/1996 | Tada et al. | 395/600 |
| 5,548,751 | 8/1996 | Ryu et al. | 395/600 |
| 5,564,019 | 10/1996 | Beausoleil et al. | 395/200.08 |

OTHER PUBLICATIONS

Ulusoy; *Lock–based Concurrency Control in Distributed Real–time databse systems*; Journal of Database Management; vol. 4, Issue 2, Spring 93, pp. 3–16.

*Primary Examiner*—Thomas G. Black
*Assistant Examiner*—Jean M. Corrielus
*Attorney, Agent, or Firm*—David J. Kappos, Esq.; Sterne, Kessler, Goldstein & Fox P.L.L.C.

[57] ABSTRACT

A database system having a sequential log that is shared by multiple computer systems is described. The database system receives data records generated by multiple computer systems, and stores such data records in the sequential log. The database system periodically reorganizes the data records in the sequential log such that the data records are stored in sequential physical memory locations of the sequential log by order of their creation.

10 Claims, 5 Drawing Sheets

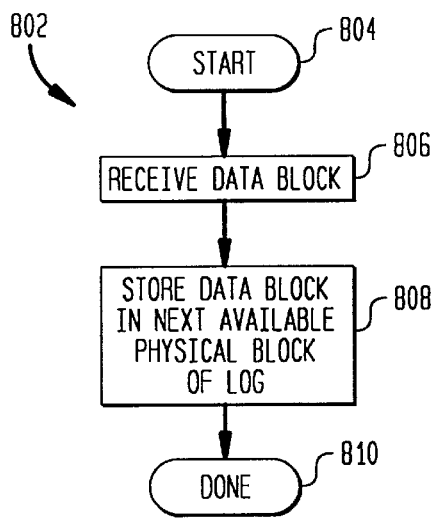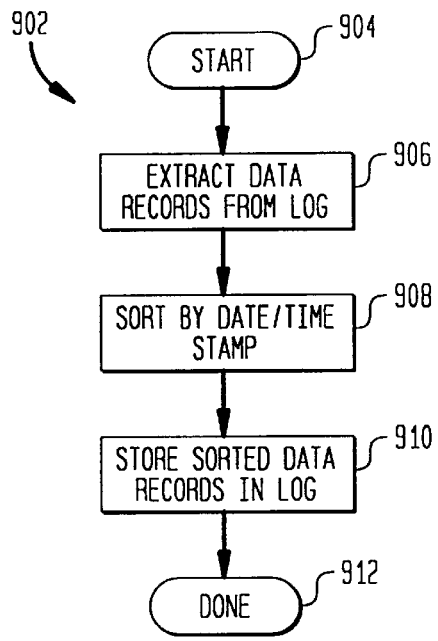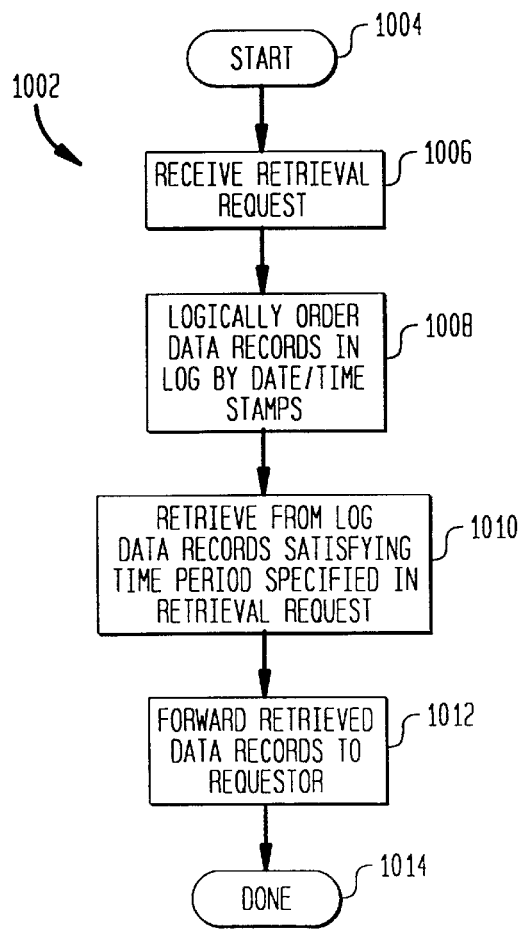

COMPUTER PROGRAM PRODUCT TO ENABLE MULTIPLE COMPUTER SYSTEMS TO SHARE SINGLE SEQUENTIAL LOG

This application is a division of U.S. application Ser. No. 08/394,582 filed Feb. 27 1995, (status: pending).

TECHNICAL FIELD

The present invention relates generally to sequential logs, and more particularly to a system and method for enabling multiple computer systems to share a sequential log.

BACKGROUND ART

As is well known, a sequential log (also herein called "sequential log file," "sequential file log," or simply "log") is a database wherein each new data record is stored in the next available (i.e., free) physical memory location of the log. In other words, in a sequential log, new data records are stored in sequential physical memory locations of the log.

For example, suppose that a computer system generates the following data records (in the indicated order): record-A, record-B, and record-C. If the computer system writes these data records to a sequential log in the order in which the data records are created, then record-A would be stored in physical location N of the log, record-B would be stored in physical location N+1 of the log, and record-C would be stored in physical location N+2 of the log (where physical location N is the first available memory location in the log).

Consider FIG. 1, which illustrates an example computer system 102 and an example sequential log 106. The sequential log 106 includes a plurality of physical memory blocks 108A–108E, where each memory block 108 is of a size to store three data records. For example, memory block 108A stores data records A, B, and C. (The letter designations of data records indicate their sequence of creation. Thus, data record A was created first, data record B was created second, data record C was created third, etc.)

The computer system 102 includes a buffer 104 (implemented using random access memory, RAM, or a combination of registers, for example). The buffer 104 is of a size to store three data records.

The computer system 102 stores data records in the buffer 104 as such data records are created. In the example of FIG. 1, the buffer 104 has stored therein data records G and H. When data record I is created, it shall be stored in the remaining slot of the buffer 104, at which time the buffer 104 shall be full.

When the buffer 104 becomes full, its contents are stored in the next available (free) block in the sequential log 106. In the example shown in FIG. 1, the next available block in the sequential log 106 is block 108C. Thus, when the buffer 104 becomes full, its contents are stored in physical memory block 108C, as indicated by line 110.

As should be clear from the above discussion, data records are stored in a sequential log in the order in which such data records are created. In the example of FIG. 1, data record A was the first to be created, and is thus stored in the first memory location of the log 106. Data record B was created immediately after data record A, and is thus stored in the next memory location of the log 106.

This characteristic of sequential logs makes them well suited for use with applications where data records must be stored in the order in which they are created. Such applications include financial institutions (such as banks and loan companies), insurance companies, package delivery services, food delivery services, etc.

Traditionally, a sequential log is dedicated to a single computer system, for the exclusive use by that computer system. This is the scenario presented in FIG. 1. With the advent of distributed and parallel processing, however, it has become advantageous to allow multiple computer systems (connected over a computer network, for example) to have access to a single sequential log.

Consider, for example, a banking scenario where a bank has a first branch and a second branch, the first and second branches being located in different cities. Suppose that a customer makes a withdraw at the first branch, and then later in the day makes a deposit at the second branch, and then still later in the day makes a withdraw at the first branch. It is preferable that the two computer systems (corresponding to the first and second branches) share the same sequential log. Otherwise, the first branch will have no knowledge of the deposit made at the second branch, such that the second withdraw at the first branch may be denied due to insufficient funds.

There are problems associated with allowing multiple computer systems to have access to a single sequential log. This is illustrated in FIG. 2, where a first computer system 202 and a second computer system 206 share a sequential log 210. The first system 202 temporarily stores data records in its internal buffer 204. Similarly, the second system 206 temporarily stores data records in its internal buffer 208. Note that the first system 202 has generated and stored data record A in its buffer 204. The second system 206 has then generated and stored data records B and C in its buffer 208. The first system 202 has then generated and stored data record D in its buffer 204.

The sequential log 210 stores data records it receives in sequential physical memory blocks, irrespective of the source of such data records. Suppose that the second system 206 generates and stores data record E in its buffer 208, and then sends the contents of its buffer 208 to the sequential log 210. Then, the first system 202 generates and stores data record F in its buffer 204, and sends the contents of its buffer 204 to the sequential log 210. In this scenario, the contents of buffer 208 would be stored in block 212A (as indicated by line 216), and the contents of buffer 204 would be stored in block 212B (as indicated by line 214).

According to this scenario, the contents of the sequential log 210 would be as follows (starting from the top of the log 210): B, C, E, A, D, F. Note that the data records are not stored in the sequential log 210 in the order in which they were created. Thus, the use of a sequential log with multiple computer systems results in improper behavior.

FIG. 3 illustrates one conventional approach for solving this problem, where each computer system is provided with its own sequential log. In the example of FIG. 3, a first computer system 302 is provided with a first sequential log 310, and a second computer system 306 is provided with a second sequential log 314. When buffer 304 in the first computer system 302 becomes full, its contents are stored in the next available block in the first log 310. Similarly, when buffer 308 in the second computer system 306 becomes full, its contents are stored in the next available block in the second log 314. At predetermined time intervals (such as the end of the day), the contents of the first and second logs 310, 314 are merged and sorted.

The approach shown in FIG. 3 is flawed for a number of reasons. First, this approach is very expensive, since each computer system must be provided with its own sequential log. Second, this approach is very complex, because the operation of all of the logs must be coordinated (so as to read out and merge the data contained in such logs).

Third, this approach is not transparent to existing computer systems. Existing computer systems expect to communicate with a single sequential log. This is not the case with this approach, which requires each computer system to operate with its own sequential log. Thus, this approach requires changes in existing computer systems.

Fourth, this approach does not support a single database. This is the case, since the data records are distributed among all of the individual sequential logs (such as logs 310 and 314 in FIG. 3). As a result, each computer system does not have real-time access to all of the data records. This characteristic has many negative implications.

Consider the first computer system 302 in FIG. 3. This first computer system 302 does not have real-time access to the data records in the second log 314. Suppose that data record C represents a deposit by a bank customer, and data record D represents a withdraw by the same bank customer. Since it does not have real-time access to the data records in the second log 314, the first computer system 302 has no knowledge of the deposit (data record C). Consequently, the first computer system 302 may deny the withdraw (data record D) for lack of sufficient funds. Thus, this approach may result in improper operation.

Thus, what is required is an improved system and method for enabling multiple computer systems to share a sequential log.

DISCLOSURE OF INVENTION

Briefly stated, the present invention is directed to an improved system and method for enabling multiple computer systems to share a sequential log. The present invention includes a database system comprising a sequential log. The database system receives data records generated by multiple computer systems, and stores such data records in the sequential log. The database system periodically reorganizes the data records in the sequential log such that the data records are stored in sequential physical memory locations of the sequential log by order of their creation.

According to the present invention, the data records include date/time creation stamps indicating the respective dates and times at which the data records were created. The database system utilizes the date/time creation stamps to reorganize the data records in the sequential log. In particular, the database system extracts data records from the sequential log, sorts the extracted data records by their date/time creation stamps, and stores the sorted data records in an archive storage device (such as the sequential log).

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein:

FIGS. 7–10 are flowcharts representing the operation of the present invention.

BEST MODE FOR CARRYING OUT THE INVENTION

Figure 3:
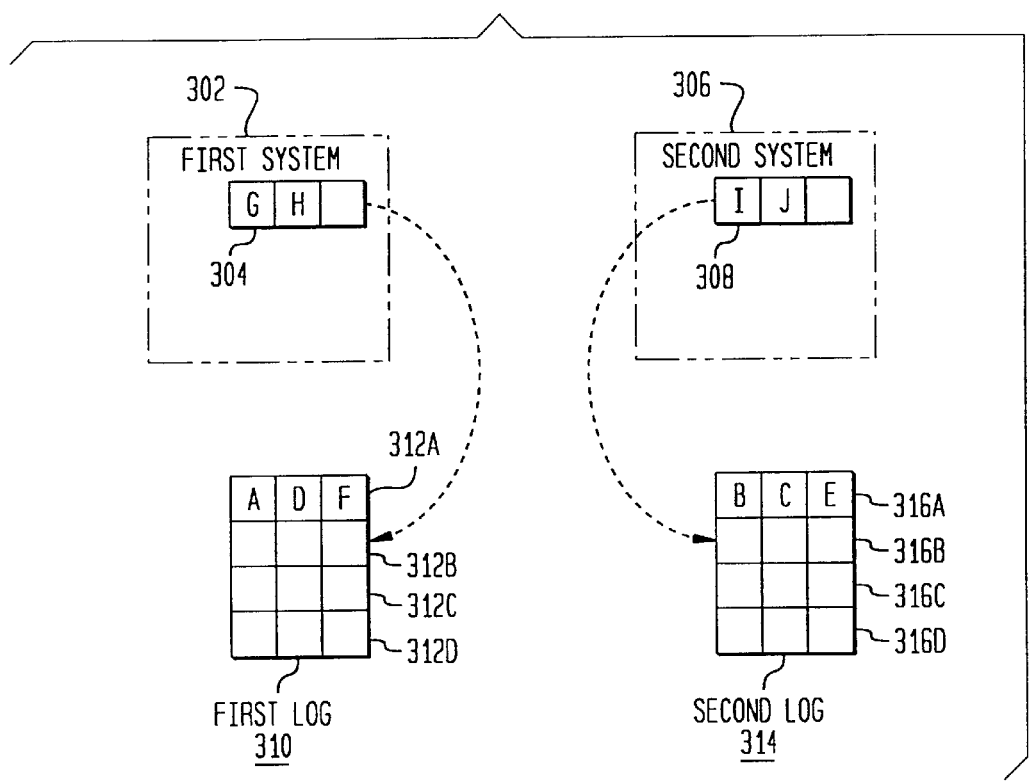

The present invention is directed to a system and method for enabling multiple computer systems to share a single sequential log. Since only a single sequential log is required, the present invention is less complex, easier to implement and maintain, and less expensive than other approaches for sharing a sequential log among multiple computer systems (such as that shown in FIG. 3A and FIG. 3B).

According to the present invention, from the perspective of the computer systems, data records are sequentially stored in the sequential log in order of creation, irrespective of the source of such creation. Each computer system can access all of the data records in the sequential log in real-time.

Figure 1:
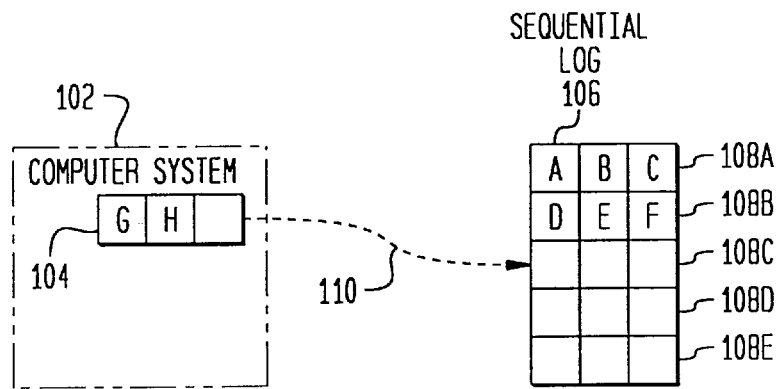
FIGS. 1–3 illustrate conventional sequential logs.
Figure 2:
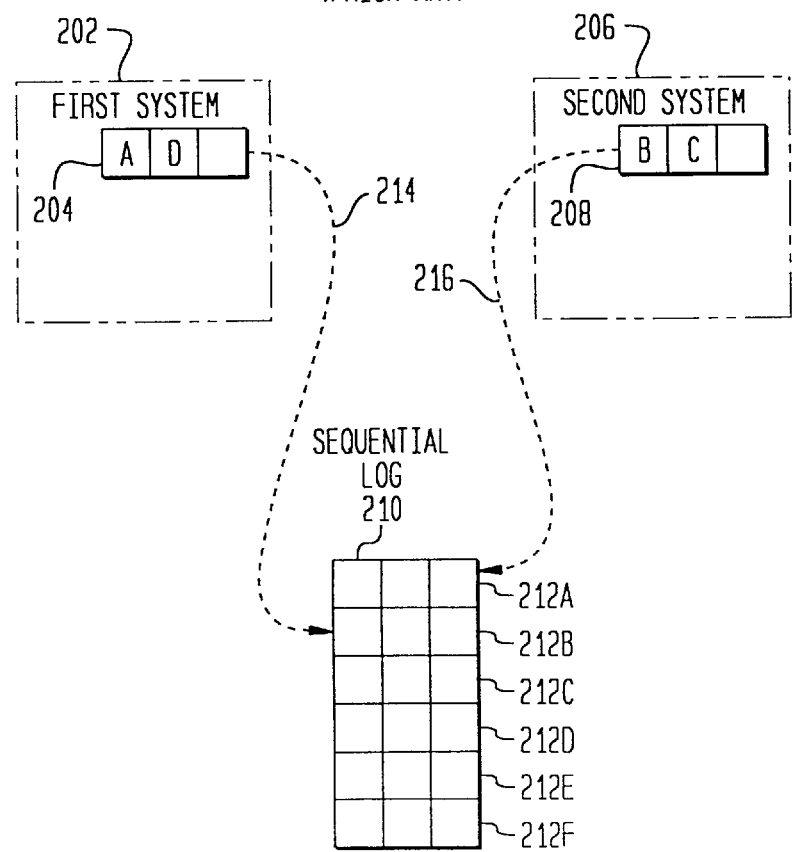

The present invention is transparent to existing computer systems (such as those shown in FIGS. 1 and 2). In other words, existing computer systems do not need to be modified to operate with the sequential log of the present invention.

The present invention is well suited for use with applications where data records must be stored in the order in which they are created (i.e., journal-type data records). Such applications include (but are not limited to) financial institutions (such as banks and loan companies), insurance companies, package delivery services, food delivery services, etc. In these applications, the sequential log is preferably implemented as a hierarchical database, although this is not required.

Figure 4:
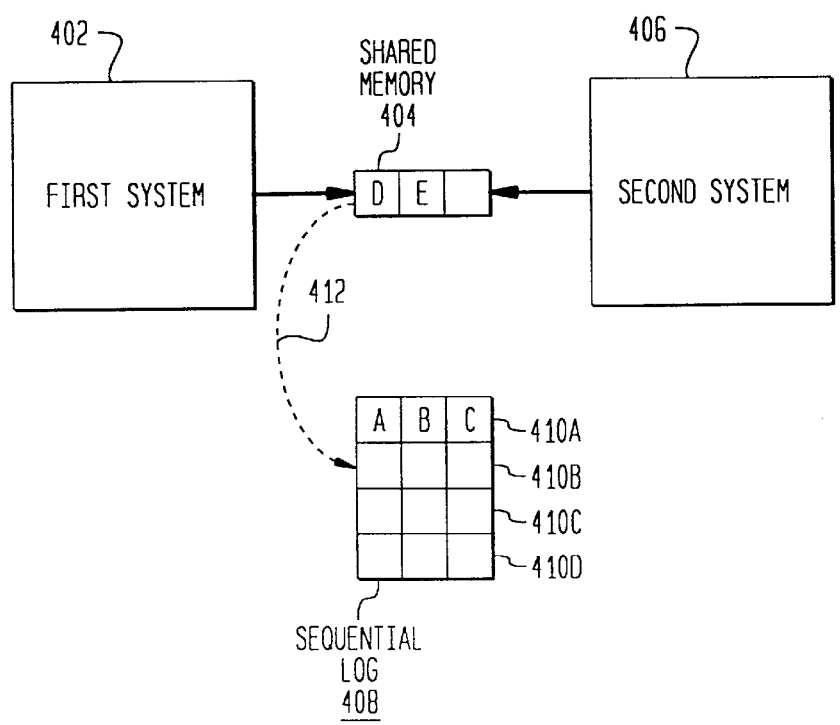
FIG. 4 illustrates an environment wherein multiple computer systems share a single sequential log according to a first embodiment of the present invention.

An approach for implementing the present invention that was contemplated by the inventors is shown in FIG. 4. According to this approach, all computer systems (such as a first computer system 402 and a second computer system 406) have access to a single shared memory 404. The computer systems 402, 406 store data records in the shared memory 404 as they are created. When the shared memory 404 becomes full, its contents are written to the first available (free) physical block in the sequential log 408.

In the example of FIG. 4, the first computer system 402 has created data record D, and has stored it in the shared memory 404. The second computer system 406 has created data record E, and has stored it in the shared memory 404.

Suppose that the second computer system 406 then creates data record F, and stores it in the shared memory 404, such that the shared memory 404 becomes full. The contents of the shared memory 404 are then stored in physical block 410B (indicated by line 412), which is the first available (free) physical block in the sequential log 408.

This approach allows multiple computer systems to access a single sequential log, and data records are sequentially stored in the sequential log in order of creation, irrespective of the source of such creation. Also, each computer system can access all of the data records in the sequential log in real-time.

However, this approach is not ideal for a number of reasons. First, this approach is not entirely transparent to existing computer systems, since they must be modified to store their data records in the shared memory 404, rather than an internal buffer. Second, this approach is subject to race condition problems. For example, if the first computer system 402 creates a record M at the same time that the second computer system 406 creates a record N, then record M will be stored in the shared memory 404 before record N only if record M arrives at the shared memory 404 before record N. (Such race condition problems can be eliminated by adding well known handshaking/protocol mechanisms.)

The inventors have developed another approach for enabling multiple computer systems to access a single sequential log. This approach, which represents the preferred embodiment of the present invention, shall now be described with reference to FIG. 5.

According to the preferred embodiment of the present invention, a plurality of computer systems (such as a first computer system 502, a second computer system 506, . . . , and an Nth computer system 510) have access to a common database system 514. The computer systems 502, 506, 510 also have access to a coordinate clock 522 (described below). Each of the computer systems 502, 506, 510 has an internal buffer 504, 508, 512, respectively (implemented using random access memory, RAM, or a series of registers, for example). The computer systems 502, 506, 510 may be local to one another, or may be located physically distant to one another (in different offices, buildings, cities, countries, etc.).

Figure 5:
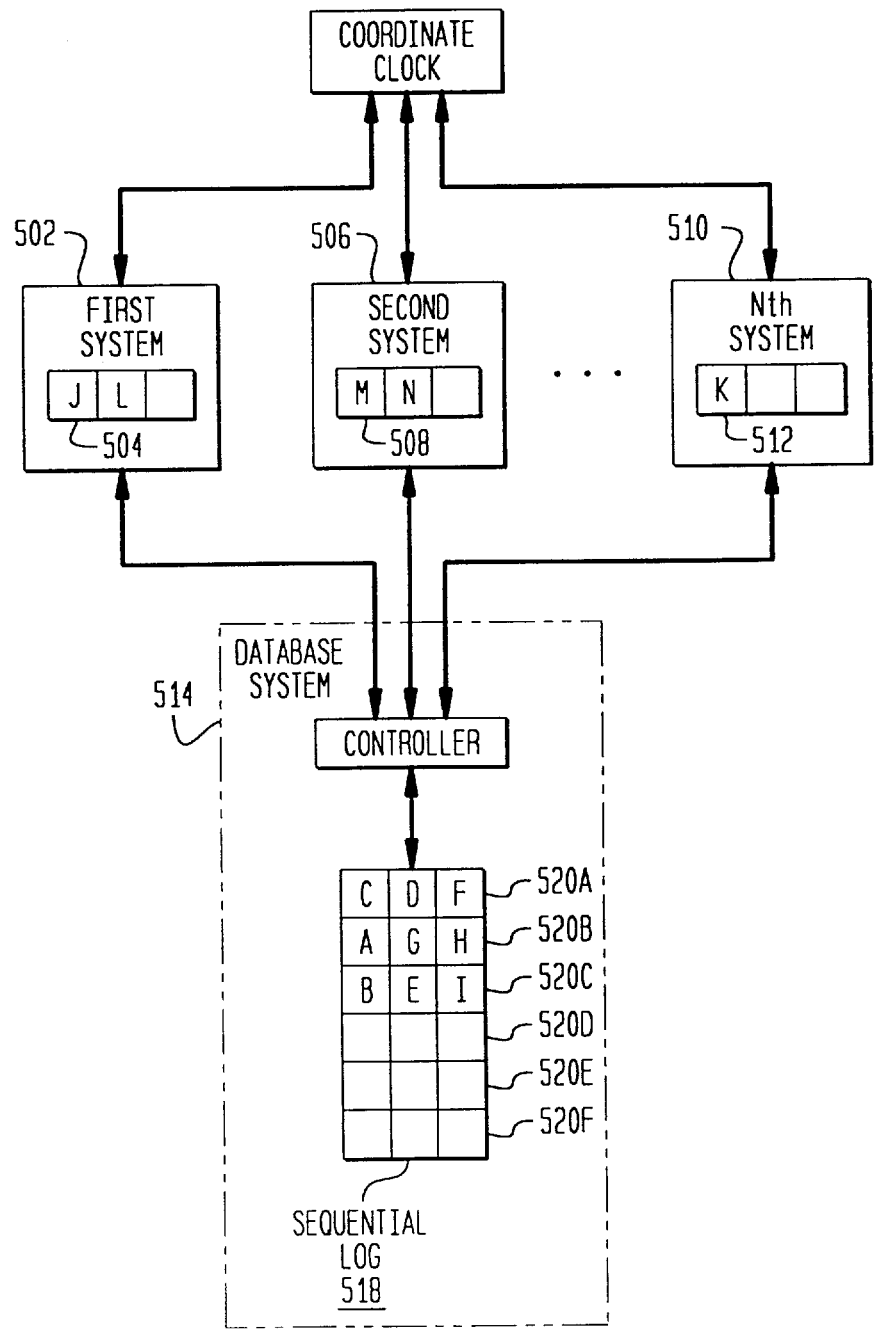
FIG. 5 illustrates an environment wherein multiple computer systems share a single sequential log according to a second embodiment of the present invention.

The database system 514 includes a sequential log 518 and a controller 516 which controls access to the sequential log 518. The sequential log 518 includes a plurality of physical memory blocks (for simplicity, only six blocks 520A–520F are shown in FIG. 5). Preferably, the size of each block 520 is the same as the size of the internal buffers 504, 508, 512. In the example of FIG. 5, the blocks 520 and the internal buffers 504, 508, 512 can each store three data records.

Figure 6:
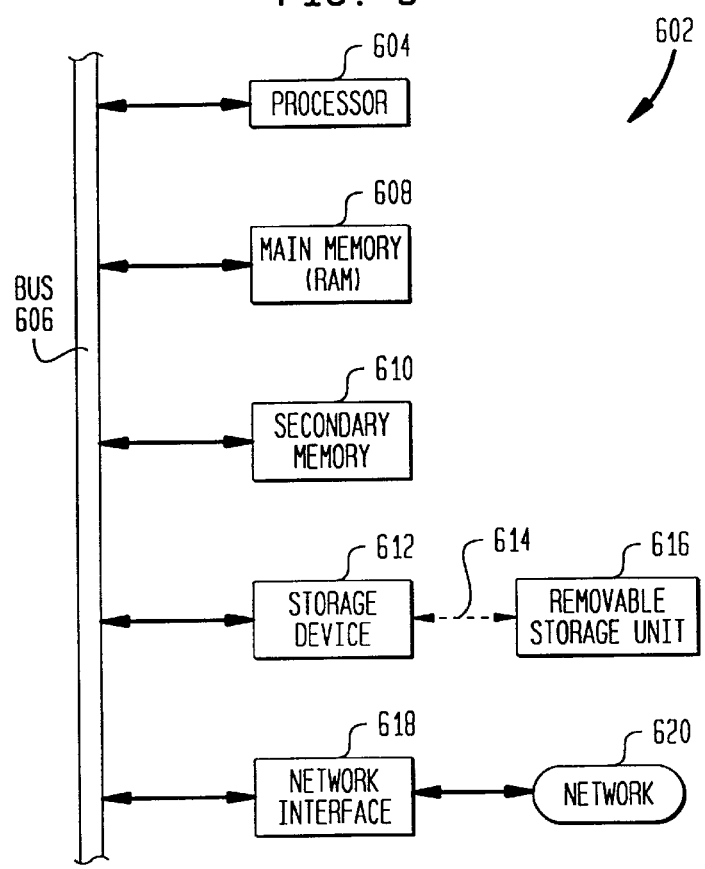
FIG. 6 is a block diagram of a computer used in the environment of FIG. 5.

Each of the computer systems 502, 506, 510 is preferably implemented using a computer 602 having a block diagram as shown in FIG. 6. The computer 602 includes one or more processors 604 connected to a bus 606. The computer 602 also includes a main memory 608, preferably random access memory (RAM), and a secondary memory 610 that includes, for example, a disk drive 612.

The computer 602 further includes a network interface 618 that couples the computer 602 to a communication network 620. Preferably, the database system 514 is connected to this communication network 620, such that the first, second, and Nth computer systems 502, 506, 510 communicate with the database system 514 via the communication network 620 (other well known means for connecting the computer systems 502, 506, 510 to the database system 514 can alternatively be used).

A suitable form of the computer 602 is the well known RISC System/6000 family of computers produced by IBM. Alternatively, the computer 602 is the well known System/390 family of computers produced by IBM. It should be understood, however, that other computers could alternatively be used without departing from the scope and spirit of the present invention.

The database system 514 may also be implemented using a computer 602 as shown in FIG. 6. In this case, the sequential log 518 is stored in the main memory 608 and/or the secondary memory 610. The controller 516 preferably represents software which (when executing) resides in main memory 608 (alternatively, the controller 516 is implemented primarily using hardware, as a hardware state machine, for example). (The computer program representing the controller 516 may be stored in a floppy disk or some other removable storage unit 616, which is read by the disk drive or some other storage device 612 and then transferred to the main memory 608.) The controller 516, when executed, enables the computer 602 to perform the features of the present invention as discussed herein. Thus, the controller 516 represents a controller of the computer 602.

The operation of the present invention shall now be described.

Figure 7:
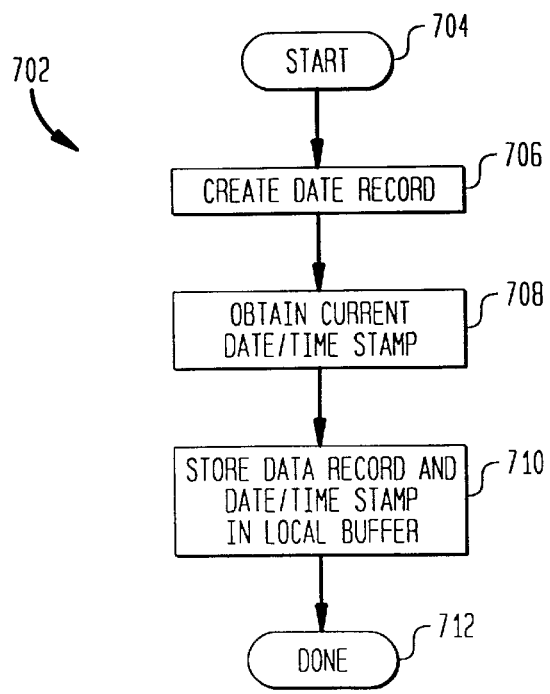

FIG. 7 is a flowchart 702 illustrating the operation of each of the computer systems 502, 506, 510 when storing a new data record in the associated internal buffer 504, 508, 512, respectively. For illustrative purposes, flowchart 702 shall be described with reference to the first computer system 502 (although the other computer systems 506, 510 operate in the same way). Flowchart 702 begins with step 704, where control immediately passes to step 706.

In step 706, the first computer system 502 creates a new data record. The new data record may be created in response to a command from a user. For example, in a banking situation, a new data record is created each time a customer performs a transaction (such as depositing, transferring, and withdrawing funds). The structure of the data record and the information stored in the data record are implementation dependent, and will be apparent to persons skilled in the relevant art.

In step 708, the first computer system 502 obtains the current date/time stamp (i.e., the current date and time). Preferably, the first computer system 502 performs step 708 by accessing and obtaining the current date/time stamp from a clock device, such as coordinate clock 522. The coordinate clock 522 keeps track of the current date and time, and makes this information available to the computer systems 502, 506, 510 upon request (the coordinate clock 522 may be connected to the computer systems 502, 506, 510 via a network, for example). Coordinate clocks are well known devices and, thus, the structure and operation of the coordinate clock 522 will be apparent to persons skilled in the art.

Alternatively, the first computer system 502 obtains the current date/time stamp in step 708 by acquiring the current date and time from its internal clock (not shown), which is synchronized with the internal clocks (not shown) in the other computer systems 506, 510. According to this alternate embodiment, the internal clocks in the computer systems 502, 506, 510 are periodically synchronized to one another using well known procedures (for example, by having the computer systems 502, 506, 510 update their internal clocks using the current date and time provided by the coordinate clock 522).

In step 710, the first computer system 502 stores the data record and the date/time stamp in the next available (i.e., free) memory location of its internal buffer 504 (the data record could be considered to include both the data and the date/time stamp). Thus, according to the present invention, a date/time stamp is associated with each data record. When its internal buffer 504 becomes full (in the example of FIG. 5, the buffer 504 becomes full after three data records have been stored in it), the first computer system 502 transfers the content of the internal buffer 504 to the database system 514. The operation of flowchart 702 is complete after step 710 is performed, as indicated by step 712.

FIG. 8 is a flowchart 802 representing the operation of the database system 514 when it receives a data block from one of the computer systems 502, 506, 510. A data block preferably represents the contents of an internal buffer 504, 508, or 512 (i.e., three data records in the example of FIG. 5). Flowchart 802 begins with step 804, where control immediately passes to step 806.

In step 806, the database system 514 receives a data block from one of the computer systems 502, 506, 510.

In step 808, the controller 516 in the database system 514 causes the data block to be stored in the next available (free) physical memory block of the sequential log 518 (thus, data records are stored in the sequential log in the order at which they arrive at the database system 514). In the example of FIG. 5, block 520D is the next available (free) physical memory block of the sequential log 518. Thus, the data block is stored in physical memory block 520D.

The operation of flowchart 802 is complete after step 808 is performed, as indicated by step 810.

Note that the data records are not stored in the sequential log 518 in the order in which they were created. However, in accordance with the present invention, the controller 516 periodically reorganizes the data records in the sequential log such that the data records are stored in sequential physical memory locations of the sequential log by order of creation of the data records. In particular, and as represented by a flowchart 902 in FIG. 9, the controller 516 periodically (such as at the end of each day) extracts the data records from the sequential log 518 (step 906), sorts the extracted data records by their date/time stamps so that they are in chronological order (step 908), and then stores the sorted data records in a storage device (step 910), such that the data records are stored in the storage device in the order in which they were created. This storage device could be the sequential log 518, or could be an archive storage device, such as a tape drive (not shown). Alternatively, the sorted data records are stored in both the sequential log 518 and the archive storage device.

The present invention also provides for real-time access to the data records in the sequential log 518. Such operation of the present invention is represented by a flowchart 1002 in FIG. 10. Operation of flowchart 1002 begins with step 1004, where control immediately passes to step 1006.

In step 1006, the controller 516 in the database system 514 receives a retrieval request from one of the computer systems' 502, 506, 510. This retrieval request specifies a time period, and represents a request to retrieve all data records which were created during this time period.

In step 1008, the controller 516 logically sorts the data records stored in the sequential log 518 by their date/time stamps, such that they are logically sorted in the order in which they were created (the data records are not physically sorted at this time; such physically sorting occurs according to flowchart 902 in FIG. 9, as described above). The controller 516 may perform step 1008 by creating an array of entries, where each entry corresponds to one of the data records in the sequential log 518, and then sorting the array entries by the corresponding data records' date/time stamps. Other methods for logically sorting the data records will be apparent to persons skilled in the relevant art.

In step 1010, the controller 516 extracts from the sequential log 518 all data records having date/time stamps which fall within the time period specified in the retrieval request.

In step 1012, the controller 516 transfers these extracted data records to the computer system 502, 506, or 510 which was the source of the retrieval request. The operation of flowchart 1002 is complete after step 1012 is performed, as indicated by step 1014.

Alternatively, the controller 516 operates as follows to process a retrieval request. First, the controller 516 extracts from the sequential log 518 all data records having date/time stamps which fall within the time period specified in the retrieval request. Second, the controller 516 physically sorts these extracted data records by their date/time stamps. Third, the controller 516 transfers these sorted data records to the computer system 502, 506, or 510 which was the source of the retrieval request.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A computer program product comprising a computer readable medium having computer program logic recorded thereon for enabling a processor to share a sequential log among a plurality of computer systems including a first computer system and a second computer system, said computer program product comprising:

means for enabling said processor to receive data records from said computer systems, said data records including a first plurality of data records created by said first computer system and a second plurality of data records created by said second computer system;

means for enabling said processor to store said data records in said sequential log; and reorganizing means for enabling said processor to periodically reorganize said data records in said sequential log such that said data records are stored in sequential physical memory locations of said sequential log by order of creation of said first plurality of data records and said second plurality of data records, irrespective of which computer system created said data records.

2. The computer program product of claim 1 in which said data records each includes a date/time creation stamp, said reorganizing means comprising:

means for enabling said processor to extract data records from said sequential log;

means for enabling said processor to sort said extracted data records by their date/time creation stamps; and means for enabling said processor to store said sorted data records in an archive storage device.

3. The computer program product of claim 2, wherein said archive storage device comprises said sequential log.

4. The computer program product of claim 1 in which said data records each includes a date/time creation stamp, further comprising:

real-time access means for enabling said processor to provide real-time access to data records in said sequential log to said computer systems.

5. The computer program product of claim 4, wherein said real-time access means comprises:

means for enabling said processor to receive a retrieval request from one of said computer systems, said retrieval request specifying a time period;

means for enabling said processor to retrieve from said sequential log data records having date/time creation stamps which fall within said time period;

means for enabling said processor to sort said retrieved data records by their date/time creation stamps; and means for enabling said processor to transfer said sorted, retrieved data records to said one of said computer systems.

6. A program storage device readable by a machine, tangibly embodying a program of instructions executable by the machine to perform method steps for sharing a sequential log among a plurality of computer systems including a first computer system and a second computer system, said method steps comprising:

(1) generating, in said computer systems, a plurality of data records, said data records including a first plurality of data records created by said first computer system and a second plurality of data records created by said second computer system;

(2) transferring said data records to a database system being shared by said computer systems;

(3) storing said data records in a sequential log contained in said database system; and (4) periodically reorganizing said data records in said sequential log such that said data records are stored in sequential physical memory locations of said sequential log by order of creation of said first plurality of data records and said second plurality of data records, irrespective of which computer system created said data records.

7. The program storage device of claim 6 in which said data records each includes a date/time creation stamp, wherein step (4) comprises the steps of:

extracting data records from said sequential log;

sorting said extracted data records by their date/time creation stamps; and storing said sorted data records in an archive storage device.

8. The program storage device of claim 7, wherein said archive storage device comprises said sequential log.

9. The program storage device of claim 8 in which said data records each includes a date/time creation stamp, wherein step (5) comprises the steps of:

receiving a retrieval request from one of said computer systems, said retrieval request specifying a time period;

retrieving from said sequential log data records having date/time creation stamps which fall within said time period;

sorting said retrieved data records by their date/time creation stamps; and means for transferring said sorted, retrieved data records to said one of said computer systems.

10. The program storage device of claim 6, said method steps further comprising the step of:

(5) providing real-time access to data records in said sequential log to said computer systems.

\* \* \* \* \*